United States Patent
Oiwa

(10) Patent No.: US 9,399,973 B2
(45) Date of Patent: Jul. 26, 2016

(54) INTAKE DEVICE

(71) Applicant: AISIN SEIKI KABUSHIKI KAISHA, Kariya-shi (JP)

(72) Inventor: Toshiyuki Oiwa, Handa (JP)

(73) Assignee: AISEN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 83 days.

(21) Appl. No.: 14/457,188

(22) Filed: Aug. 12, 2014

(65) Prior Publication Data

US 2015/0047595 A1   Feb. 19, 2015

(30) Foreign Application Priority Data

Aug. 19, 2013   (JP) ................................ 2013-169896

(51) Int. Cl.
| | |
|---|---|
| *F16K 1/226* | (2006.01) |
| *F02M 35/104* | (2006.01) |
| *F02B 27/02* | (2006.01) |
| *F02M 35/10* | (2006.01) |

(52) U.S. Cl.
CPC .......... *F02M 35/104* (2013.01); *F02B 27/0273* (2013.01); *F02M 35/1036* (2013.01); *F02M 35/10045* (2013.01); *F02M 35/10065* (2013.01); *Y02T 10/146* (2013.01)

(58) Field of Classification Search
CPC .......... F02M 35/104; F02M 35/10045; F02M 35/10065; F02M 25/1036; F02B 27/0273; Y02T 10/146
USPC .................................................... 123/184.55
See application file for complete search history.

(56) References Cited

U.S. PATENT DOCUMENTS

| | | | | |
|---|---|---|---|---|
| 4,491,106 | A | * | 1/1985 | Morris .......................... 123/337 |
| 5,603,296 | A | * | 2/1997 | Park .......................... 123/184.55 |
| 5,749,336 | A | * | 5/1998 | Tamaki et al. ................ 123/337 |
| 5,979,871 | A | * | 11/1999 | Forbes et al. ................. 251/305 |
| 6,135,418 | A | | 10/2000 | Hatton |

(Continued)

FOREIGN PATENT DOCUMENTS

| | | |
|---|---|---|
| EP | 1 028 238 A2 | 8/2000 |
| EP | 1 498 589 A2 | 1/2005 |

(Continued)

OTHER PUBLICATIONS

Extended European Search Report dated Jan. 16, 2015, issued by the European Patent Office in the corresponding European Application No. 14180352.8. (8 pages).

(Continued)

*Primary Examiner* — Marguerite McMahon
(74) *Attorney, Agent, or Firm* — Buchanan Ingersoll & Rooney PC

(57) ABSTRACT

An intake device includes: an intake port; a valve body which is disposed in the intake port and rotated around a rotating shaft between an opening position and a closing position; and a seal surface which is integrally provided at the intake port and made up of an inner wall surface with which the valve body comes into contact at the closing position of the valve body, wherein the seal surface includes a first seal surface having an inner contact portion which protrudes to the inside of the intake port and a first outer contact portion which is located further to the outside than the inner contact portion, and a second seal surface having a second outer contact portion without having the inner contact portion.

9 Claims, 8 Drawing Sheets

(56) References Cited

U.S. PATENT DOCUMENTS

| | | | |
|---|---|---|---|
| 6,332,442 B1 | 12/2001 | Komada et al. | |
| 6,446,591 B1 * | 9/2002 | Chae et al. | 123/184.61 |
| 6,908,072 B2 * | 6/2005 | Hattori | 251/306 |
| 7,726,272 B2 * | 6/2010 | Kitadani et al. | 123/184.53 |
| 8,043,148 B2 * | 10/2011 | Eguchi et al. | 454/262 |
| 2004/0055565 A1 * | 3/2004 | Yamamoto et al. | 123/337 |
| 2009/0194055 A1 * | 8/2009 | Kitadani et al. | 123/184.55 |
| 2010/0059009 A1 | 3/2010 | Goldin et al. | |
| 2010/0294227 A1 * | 11/2010 | Magnan et al. | 123/184.55 |

FOREIGN PATENT DOCUMENTS

| | | |
|---|---|---|
| JP | 2008-298043 A | 12/2008 |
| JP | 2010-001847 A | 1/2010 |

OTHER PUBLICATIONS

Communication under Rule 71(3) EPC dated May 6, 2016, issued by the European Patent Office in corresponding European Application No. EP 14180352.8. (6 pages).

* cited by examiner

VALVE BODY ON DOWNSTREAM SIDE

VALVE BODY ON UPSTREAM SIDE

SEAL SURFACE PORTION ON DOWNSTREAM SIDE

SEAL SIDE SURFACE PORTION ON DOWNSTREAM SIDE

SEAL SURFACE PORTION ON UPSTREAM SIDE

SEAL SIDE SURFACE PORTION ON UPSTREAM SIDE

INTAKE DEVICE

CROSS REFERENCE TO RELATED APPLICATIONS

This application is based on and claims priority under 35 U.S.C. §119 to Japanese Patent Application 2013-169896, filed on Aug. 19, 2013, the entire contents of which are incorporated herein by reference.

TECHNICAL FIELD

This disclosure relates to an intake device.

BACKGROUND DISCUSSION

In the related art, an intake device provided with a seal surface which is made up of an inner wall surface with which a valve body comes into contact is known (refer to, for example, JP 2010-1847A (Reference 1)).

Reference 1 described above discloses a variable intake device which is provided with an intake control valve capable of opening and closing an opening portion provided in a collector and is switchable between a first port in which intake air passes through the opening portion in a case where the intake control valve is at an opening position, and a second port in which intake air detours without passing through the opening portion in a case where the intake control valve is at a closing position. A seal lip made of a rubber material is provided at an outer peripheral end portion of the intake control valve of the variable intake device. Further, in the variable intake device, a configuration is made such that in a case where the intake control valve is at the closing position, the seal lip and an inner wall surface of the opening portion come into contact with each other, whereby the opening portion is closed by the intake control valve, and an overhang portion, provided so as to overhang toward the inside of the opening portion from the inner wall surface of the opening portion, and the seal lip come into contact with each other, thereby suppressing the occurrence of a striking sound due to the contact of a portion in which the seal lip is not formed, of the intake control valve with the inner wall surface of the opening portion. Here, the overhang portion is formed over the entirety of four sides of the inner wall surface of the opening portion.

However, in the intake control valve of Reference 1 described above, since the overhang portion provided so as to overhang toward the inside of the opening portion from the inner wall surface of the opening portion is formed over the entirety of four sides of the inner wall surface of the opening portion, an opening area of the opening portion is reduced by an amount corresponding to the overhanging of the overhang portion over the entirety of the four sides. For this reason, an intake air flow path in the first port in which intake air passes through the opening portion narrows, and as a result, there is a problem in that pressure loss of intake air in a case where the intake control valve is at the opening position increases. Further, in a case where an overhang amount of the overhang portion is reduced in order to suppress an increase in pressure loss of intake air, the seal lip and the overhang portion become prone to come into contact with each other at a position deviated from a proper contact position. For this reason, a case where the intake control valve is deviated with respect to the opening portion, whereby the opening portion is not sufficiently closed, or a case where the intake control valve over rotates without contact at a proper contact position, or the like is considered to easily occur. As a result, there is a problem in that it is not possible to sufficiently maintain sealing properties (close contact properties) between the intake control valve and the opening portion.

SUMMARY

Thus, a need exists for an intake device which is not suspectable to the drawback mentioned above.

An aspect of this disclosure is directed to an intake device including: an intake port; a valve body which is disposed in the intake port and rotated around a rotating shaft between an opening position and a closing position; and a seal surface which is integrally provided at the intake port and made up of an inner wall surface with which the valve body comes into contact at the closing position of the valve body, wherein the seal surface includes a first seal surface having an inner contact portion which protrudes to the inside of the intake port and a first outer contact portion which is located further to the outside than the inner contact portion, and a second seal surface having a second outer contact portion without having the inner contact portion.

In the intake device according to the aspect of this disclosure, as described above, the first seal surface having the inner contact portion which protrudes to the inside of the intake port and the first outer contact portion which is located further to the outside than the inner contact portion, and the second seal surface having the second outer contact portion without having an inner contact portion are provided in the seal surface, whereby an inner contact portion protruding to the inside of the intake port is not provided in the second seal surface, and therefore, it is possible to suppress a narrowing of an intake air flow path in the second seal surface. In this way, it is possible to suppress an increase in pressure loss of intake air. Further, the first seal surface having the inner contact portion is provided in the seal surface, whereby it is possible to perform adjustment such that a contact position between the first outer contact portion and the valve body and a contact position between the second outer contact portion and the valve body become proper, with a position where the inner contact portion of the first seal surface and the valve body come into contact with each other as a proper contact position which becomes a reference. In this way, it is possible to suppress the contact of the valve body with the first outer contact portion and the second outer contact portion in a deviated state and it is possible to suppress the valve body from over rotating without contact with the seal surface. Therefore, it is possible to favorably maintain sealing properties (close contact properties) between the valve body and the seal surface.

According to the aspects of this disclosure, as described above, it is possible to suppress an increase in pressure loss of intake air by suppressing a narrowing of the intake air flow path, and it is possible to favorably maintain sealing properties (close contact properties) between the valve body and the seal surface.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment disclosed here will be described based on the drawings.

The configuration of an intake device 100 according to an embodiment disclosed here will be described with reference to FIGS. 1 to 14.

Figure 1:
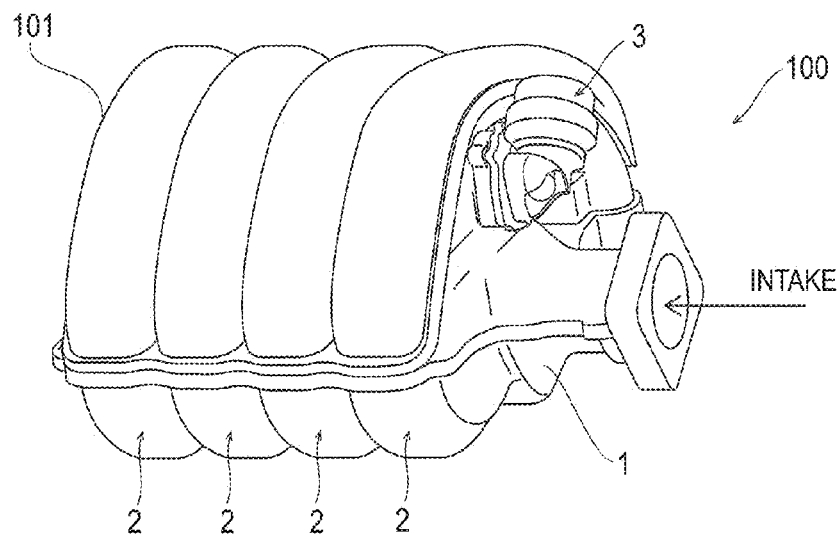
FIG. 1 is a perspective view showing the configuration of an intake device according to an embodiment disclosed here.
Figure 2:
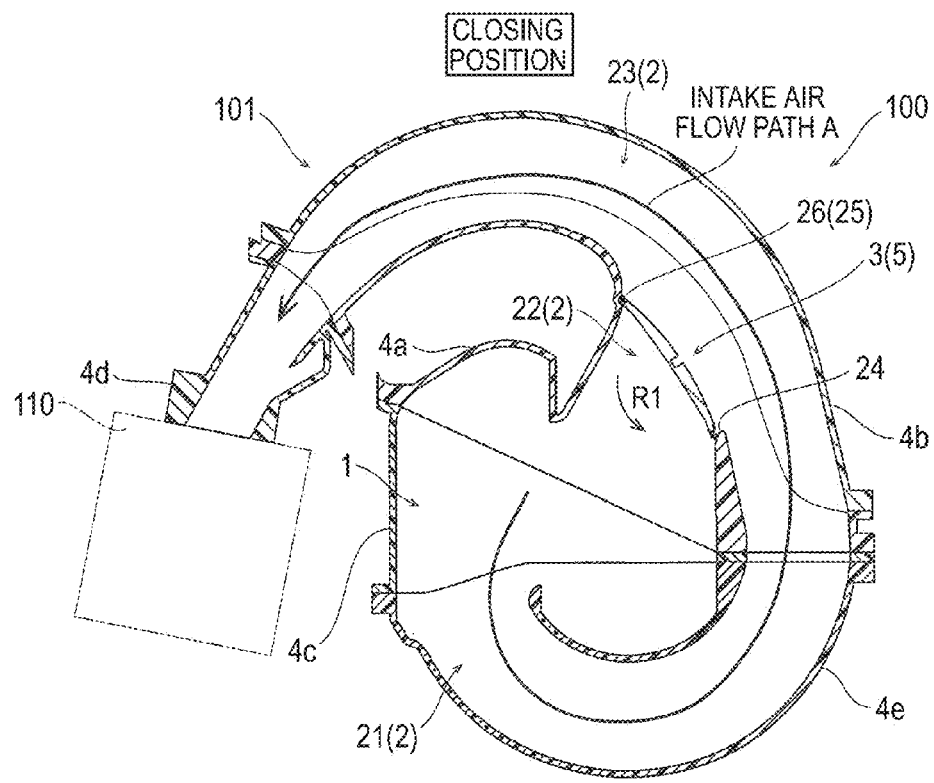
FIG. 2 is a schematic cross-sectional view at a closing position of the intake device according to the embodiment disclosed here.

The intake device 100 is an intake device which is provided in an in-line four-cylinder engine (not shown) for an automobile, as shown in FIGS. 1 and 2. The intake device 100 is provided with a surge tank 1, four intake ports 2 branching from the surge tank 1 and disposed downstream of the surge tank 1, and an intake control valve 3 (refer to FIG. 2) provided inside the four intake ports 2. Further, the four intake ports 2 and a valve body 5 (described later) of the intake control valve 3 are made of a resin material and made of, for example, nylon 6 (PA 6). The intake device 100 is connected to a cylinder head 110, as shown in FIG. 2, and the four intake ports 2 are respectively connected to the respective cylinders of an engine through the cylinder head 110.

Figure 3:
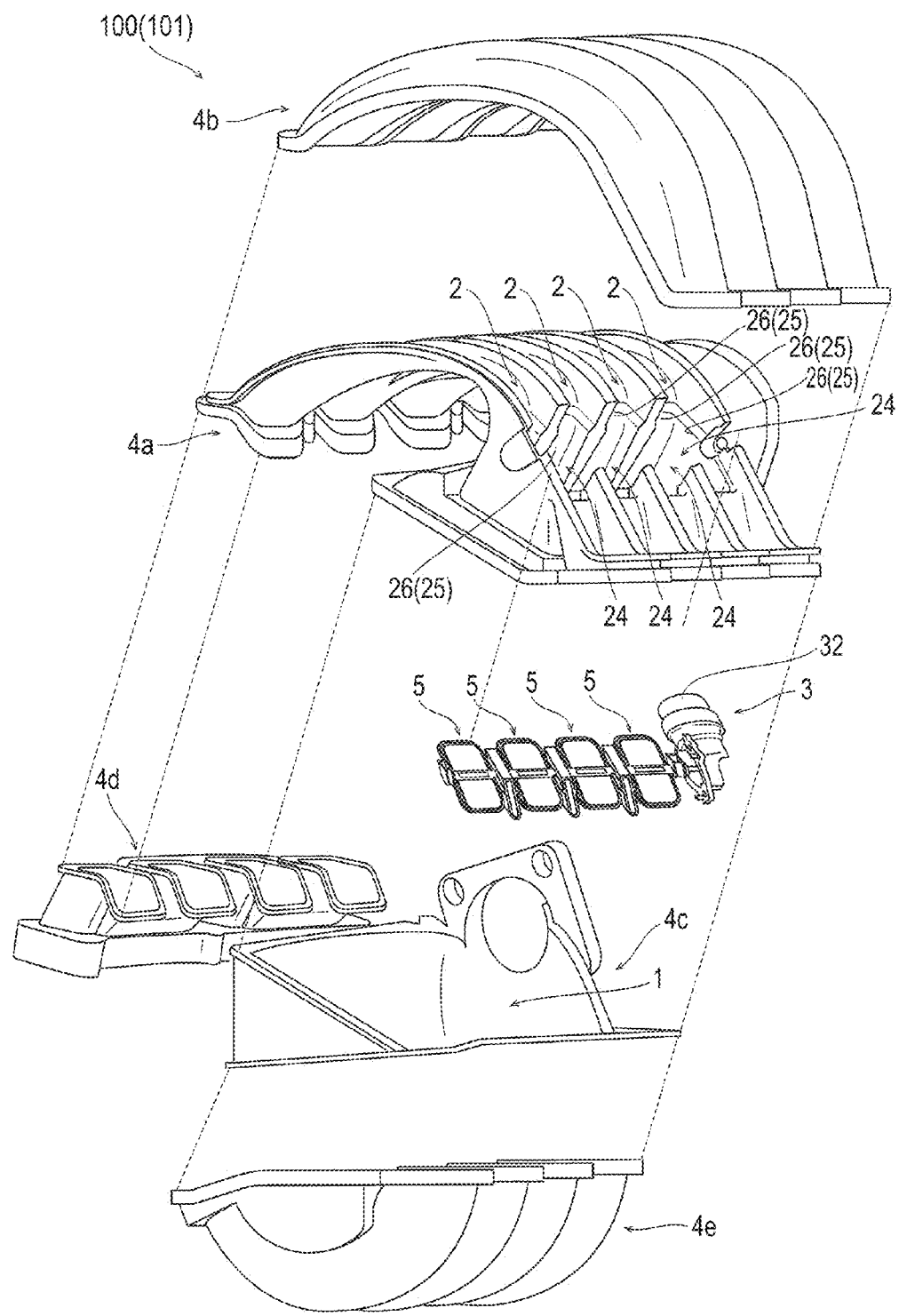
FIG. 3 is an exploded perspective view showing the configuration of the intake device according to the embodiment disclosed here.

The intake device 100 includes an intake device main body 101 composed of five main body portions 4a to 4e, as shown in FIGS. 2 and 3, and the respective main body portions 4a to 4e are joined in an integrated manner in a state where the intake control valve 3 is mounted on the main body portion 4a.

As shown in FIG. 1, intake air arriving through an air cleaner and a throttle, none of which is shown, flows in the surge tank 1. The four intake ports 2 are disposed so as to be aligned in a predetermined direction. Further, as shown in FIG. 2, each of the four intake ports 2 includes a first port portion 21, a second port portion 22, and an outlet port portion 23 which is connected to a cylinder of an engine on the downstream side of the first port portion 21 and the second port portion 22. The first port portion 21 is provided so as to extend so as to detour from the surge tank 1 and be connected to the outlet port portion 23 on the downstream side. The second port portion 22 is provided so as to connect the surge tank 1 and the outlet port portion 23 through the intake control valve 3.

Further, an opening portion 24 having a substantially rectangular shape in a plan view is provided between the surge tank 1 and the outlet port portion 23 disposed downstream of the surge tank 1 and at a connection portion between the second port portion 22 and the outlet port portion 23. The intake control valve 3 is disposed in the opening portion 24.

Figure 4:
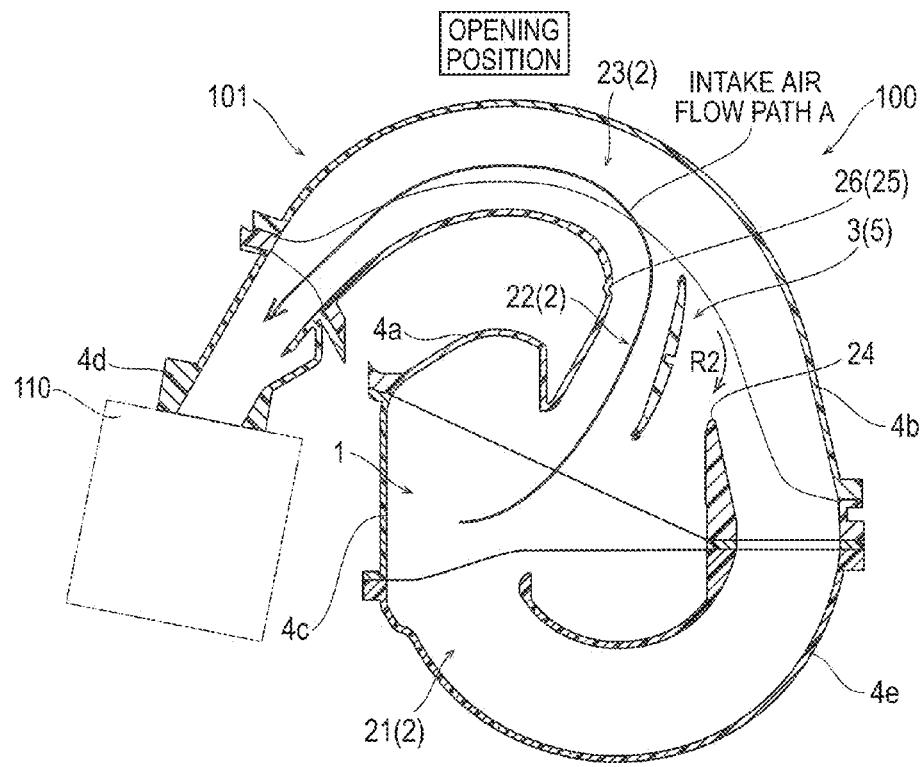
FIG. 4 is a schematic cross-sectional view at an opening position of the intake device according to the embodiment disclosed here.

Here, in the intake device 100, in a case where the intake control valve 3 is at a closing position as shown in FIG. 2, a long port having a long intake air flow path length is formed by the first port portion 21 and the outlet port portion 23, and in a case where the intake control valve 3 is at an opening position as shown in FIG. 4, a short port having a short intake air flow path length is formed by the second port portion 22 and the outlet port portion 23, whereby the intake control valve 3 is configured so as to be able to change an intake air flow path length. That is, the valve body 5 (described later) of the intake control valve 3 is configured so as to be able to change an intake air flow path length to each cylinder of an engine by opening and closing the opening portion 24. In this way, it is possible to supply a more appropriate amount of intake air to an engine by changing an intake air flow path length according to an engine speed, engine load, or the like. In addition, since an intake air flow path A becomes narrower as an opening area of the opening portion 24 becomes smaller, pressure loss of intake air increases.

Figure 5:
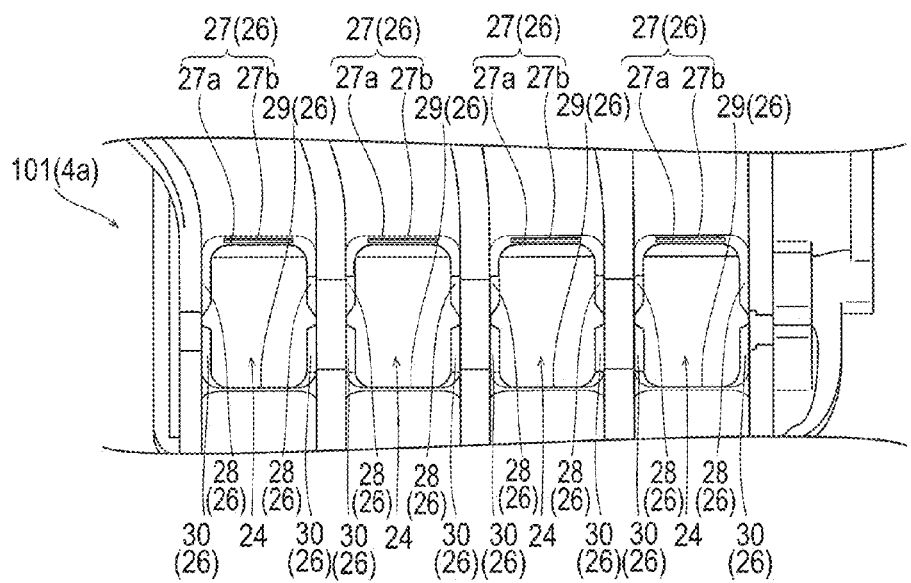
FIG. 5 is a plan view showing an opening portion of the intake device according to the embodiment disclosed here.

Further, as shown in FIG. 5, a seal surface 26 with which the valve body 5 of the intake control valve 3 comes into contact in a case where the intake control valve 3 is at the closing position is formed on an inner wall surface 25 of the opening portion 24 (the intake port 2).

Figure 6:
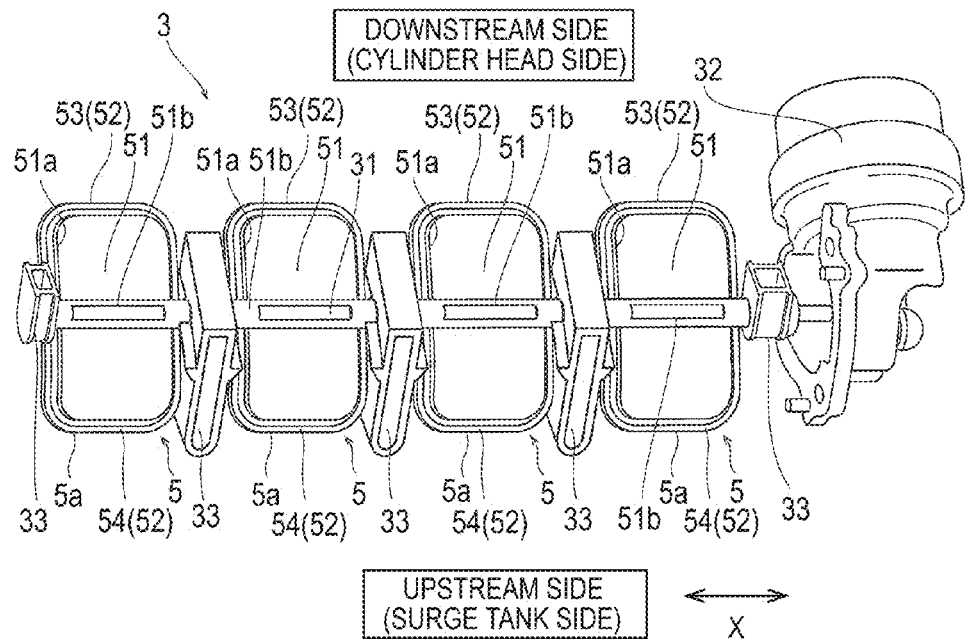
FIG. 6 is a perspective view showing an intake control valve of the intake device according to the embodiment disclosed here.

The intake control valve 3 includes four valve bodies 5, each of which is provided in each of the four intake ports 2 and opens and closes the second port portion 22 (the opening portion 24, refer to FIG. 3), a rotating shaft 31 which rotates along with the four valve bodies 5, an actuator 32 which rotates the rotating shaft 31, and five bearing members 33 which rotatably support the rotating shaft 31, as shown in FIG. 6. Further, the intake control valve 3 is configured so as to simultaneously perform opening and closing operations of the opening portions 24 of all the four intake port 2 by rotating the four valve bodies 5 together by rotating the rotating shaft 31. Further, the bearing member 33 is configured so as to be able to be mounted on the main body portion 4a of the intake device main body 101 configuring the intake port 2, in a state of rotatably supporting the rotating shaft 31, as shown in FIG. 3. In addition, the valve body 5 is an example of a "variable intake valve body" in this disclosure.

Further, the valve body 5 is formed into a substantially rectangular shape having four sides so as to correspond to the opening portion 24 in a plan view, as shown in FIG. 6. Further, the valve body 5 is configured such that an end on one side in a longitudinal direction (a direction orthogonal to the rotating shaft 31) is located on the downstream side (the cylinder head 110 side) and an end on the other side is disposed on the upstream side (the surge tank 1 side).

The rotating shaft 31 is made of a square metallic shaft which extends in an X direction (a direction in which the four intake ports 2 are aligned) orthogonal to the intake port 2 and passes through the four second port portions 22. The actuator 32 is a negative pressure actuator which generates a driving force by the supply of negative pressure. Further, the bearing members 33 are disposed at positions sandwiching each valve body 5 therebetween. Further, the valve body 5 is configured so as to move to the closing position by rotating from the opening position shown in FIG. 4 in a rotation direction R1 with the rotating shaft 31 as a rotation center, as shown in FIG. 2, and move to the opening position by rotating from the closing position shown in FIG. 2 in a rotation direction R2 with the rotating shaft 31 as a rotation center, as shown in FIG. 4.

Figure 7:
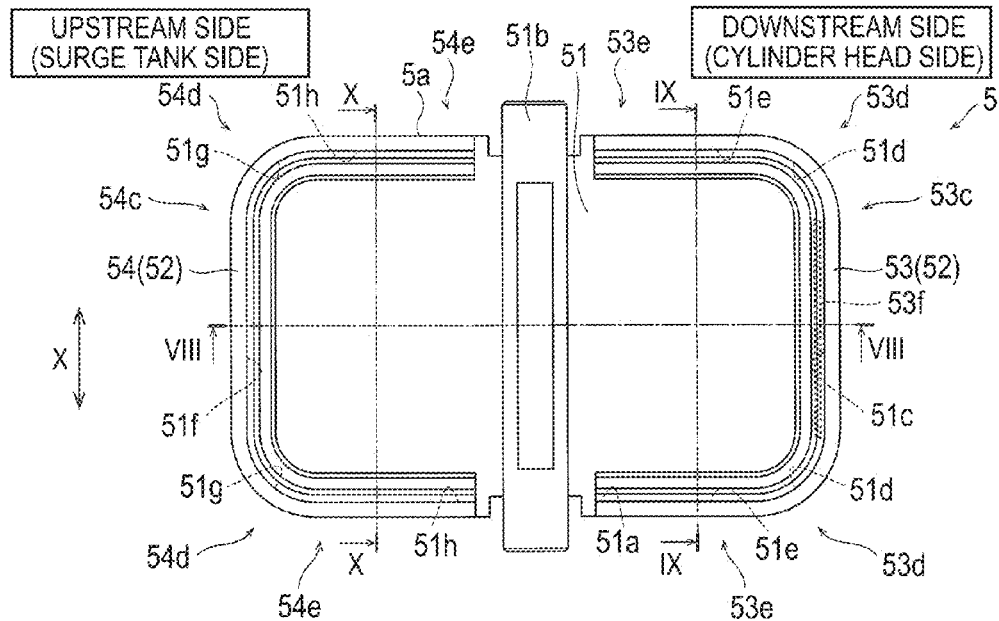
FIG. 7 is a plan view showing a valve body of the intake control valve of the intake device according to the embodiment disclosed here.

Further, the valve body 5 has a valve body main body 51 having a substantially rectangular outer shape having four sides corresponding to those of the opening portion 24 in a plan view, and a seal lip 52 disposed at an outer periphery 51a of the valve body main body 51, as shown in FIG. 7. In addition, the valve body main body 51 is a plated-shaped member made of resin and is formed in the form of a bow (refer to FIG. 8) in a side view so as to follow the shape of the intake port 2 extending in a curved shape at the closing position. Further, the valve body main body 51 is configured such that the rotating shaft 31 is inserted into a shaft insertion portion 51b extending in the X direction along the rotating shaft 31 so as to traverse a central portion in the longitudinal direction, whereby the four valve bodies 5 rotate integrally with the rotating shaft 31. In addition, the seal lip 52 is an example of a "seal member" in this disclosure.

The seal lip 52 is made of rubber and is configured so as to be elastically deformable. Further, the seal lip 52 is configured to include a seal portion 53 which is mounted on the outer periphery 51a on the downstream side (the cylinder head 110 side), of the outer periphery 51a of the valve body main body 51, and a seal portion 54 which is mounted on the outer periphery 51a on the upstream side (the surge tank 1 side), of the outer periphery 51a of the valve body main body 51.

As shown in FIG. 7, the seal portion 53 is provided in a straight portion 51c extending along the rotating shaft 31, of the outer periphery 51a on the downstream side of the valve body main body 51, and a pair of straight portions 51e, each of which is connected to each of both ends of the straight portion 51c through a curved portion 51d and extends to the vicinity of the shaft insertion portion 51b so as to be orthogonal to the rotating shaft 31. Further, the seal portion 54 is provided in a straight portion 51f extending along the rotating shaft 31, of the outer periphery 51a on the upstream side of the valve body main body 51, and a pair of straight portions 51h, each of which is connected to each of both ends of the straight portion 51f through a curved portion 51g and extends to the vicinity of the shaft insertion portion 51b so as to be orthogonal to the rotating shaft 31. That is, the seal portion 53 and the seal portion 54 are configured with separate bodies from each other with the shaft insertion portion 51b interposed therebetween. In addition, the straight portions 51c and 51f respectively are examples of a "side portion on the downstream side" and a "side portion on the upstream side" in this disclosure. Further, each of the pair of straight portions 51e and the pair of straight portions 51h is an example of a "pair of side portions".

Figure 8:
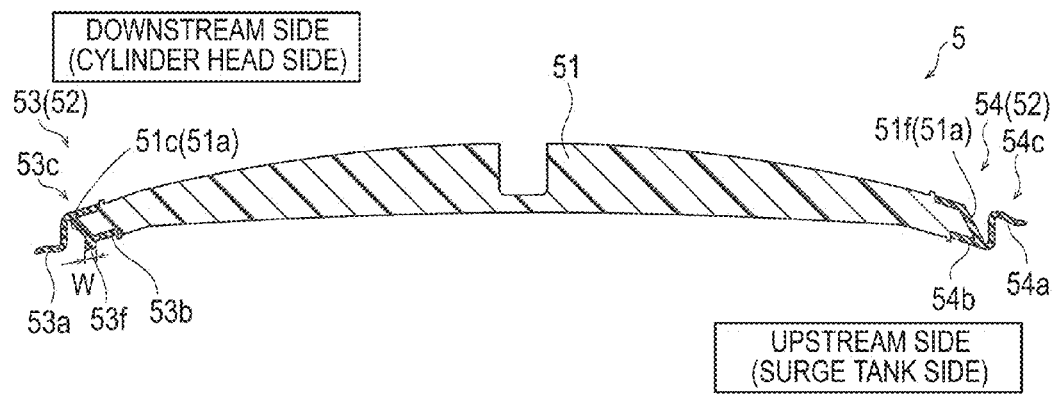
FIG. 8 is a cross-sectional view of the valve body taken along line VIII-VIII of FIG. 7.
Figure 9:
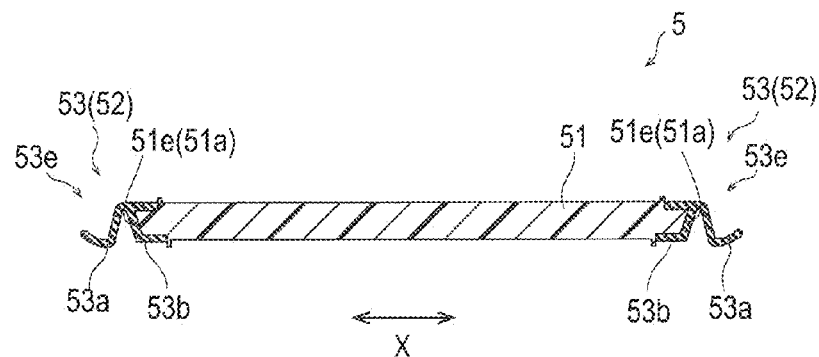
FIG. 9 is a cross-sectional view of the valve body taken along line IX-IX of FIG. 7.
Figure 10:
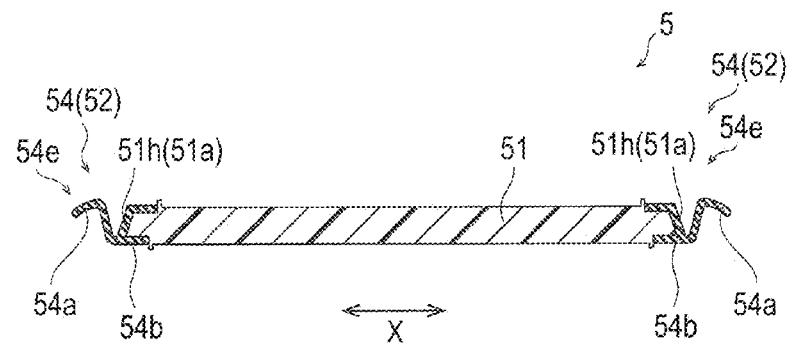
FIG. 10 is a cross-sectional view of the valve body taken along line X-X of FIG. 7.

The seal portions 53 and 54 respectively include approximately V-shaped deformation portions 53a and 54a, and mounting portions 53b and 54b for being mounted on the valve body main body 51, as shown in FIGS. 8 to 10. The approximately V-shaped deformation portions 53a and 54a are configured such that when the valve body 5 is at the closing position, the outer periphery 51a of the valve body main body 51 and the seal surface 26 come close to each other, whereby an approximate V-shape is crushed and deformed into an approximate U-shape, as shown in FIGS. 11 to 14. At this time, a configuration is made such that one side of the approximate U-shape of each of the deformation portions 53a and 54a comes into surface contact with the seal surface 26, whereby an outer peripheral portion 5a of the valve body 5 and the seal surface 26 come into contact with each other and as a result, the outer peripheral portion 5a of the valve body 5 and the seal surface 26 are sealed. Further, each of the mounting portions 53b and 54b is vulcanized and bonded to the outer periphery 51a of the valve body main body 51 and both surfaces in the vicinity of the outer periphery 51a, thereby being mounted on the outer periphery 51a of the valve body main body 51.

Further, as shown in FIG. 7, in the seal portion 53 on the downstream side, seal portions 53c, 53d, and 53e are respectively formed at positions corresponding to the straight portion 51c, the pair of curved portions 51d, and the pair of straight portions 51e of the valve body main body 51. Similarly, in the seal portion 54 on the upstream side, seal portions 54c, 54d, and 54e are respectively formed at positions corresponding to the straight portion 51f, the pair of curved portions 51g, and the pair of straight portions 51h of the valve body main body 51. In addition, the seal portion 53c is an example of a "first portion" and a "first seal portion" in this disclosure. Further, the seal portions 53d, 53e, 54c, 54d, and 54e are an example of a "second portion" and a "second seal portion" in this disclosure.

Further, each of the seal portions 53c and 54c is formed in a straight line shape so as to extend along a direction (the X direction) in which the rotating shaft 31 extends, on each of the downstream side and the upstream side. Further, each of the seal portions 53e and 54e is formed so as to extend along a direction orthogonal to the X direction in which the rotating shaft 31 extends, on each of the downstream side and the upstream side. In addition, the seal portions 53c and 54c respectively are examples of a "side on the downstream side" and a "side on the upstream side" in this disclosure. Further, the seal portions 53e and 54e are an example of a "pair of sides" in this disclosure.

Further, the seal portions 53c, 53d, and 53e are formed so as to be located at the outer peripheral portion 5a on the downstream side of the valve body 5, and each of the seal portions 53c, 53d, and 53e has the deformation portion 53a and the mounting portion 53b. Further, the seal portions 54c, 54d, and 54e are formed so as to be located at the outer peripheral portion 5a on the upstream side of the valve body 5, and each of the seal portions 54c, 54d, and 54e has the deformation portion 54a and the mounting portion 54b. In addition, the deformation portion 53a of the seal portion 53c is an example of a "first outer seal portion" in this disclosure, and the deformation portions 53a of the seal portions 53d and 53e and the deformation portions 54a of the seal portions 54c, 54d, and 54e are all together an example of a "second outer seal portion" in this disclosure.

In addition, in the seal portion 53c, a stopper portion 53f is provided which protrudes toward a direction away from the surface of the valve body main body 51 (toward the upstream side, the surge tank 1 side) from the mounting portion 53b, as shown in FIG. 8. The stopper portion 53f is provided only in the seal portion 53c of the seal portion 53 and is not provided in the seal portions 53d and 53e. Further, the stopper portion 53f is not provided in the seal portions 54c, 54d, and 54e of the seal portion 54. Further, the stopper portion 53f is formed integrally with the deformation portion 53a and the mounting portion 53b of the seal portion 53c. In addition, the stopper portion 53f is an example of an "inner seal portion" in this disclosure.

Further, the stopper portion 53f is formed so as to come into contact with an inner contact portion 27a (refer to FIG. 11) of a seal surface portion 27 (described later). For this reason, a contact surface of the stopper portion 53f is formed so as to be substantially flat and have a certain amount of width W in the direction orthogonal to the X direction in which the rotating shaft 31 extends.

Further, the seal surface 26 has the seal surface portion 27 and a seal side surface portion 28 with which the seal portion 53 comes into contact on the downstream side of the valve body 5, and a seal surface portion 29 and a seal side surface portion 30 with which the seal portion 54 comes into contact on the upstream side of the valve body 5, as shown in FIG. 5. In addition, the seal surface portion 27 is an example of a "first seal surface" in this disclosure, and the seal surface portion 29 and the seal side surface portions 28 and 30 are an example of a "second seal surface" in this disclosure.

Figure 11:
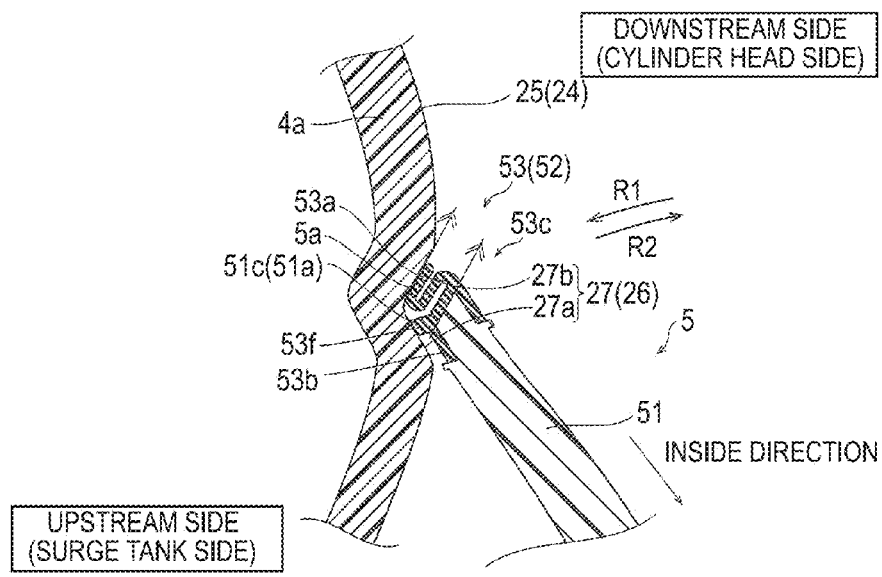
FIG. 11 is an enlarged cross-sectional view showing a seal surface portion on the downstream side at the closing position of the intake device according to the embodiment disclosed here.
Figure 12:
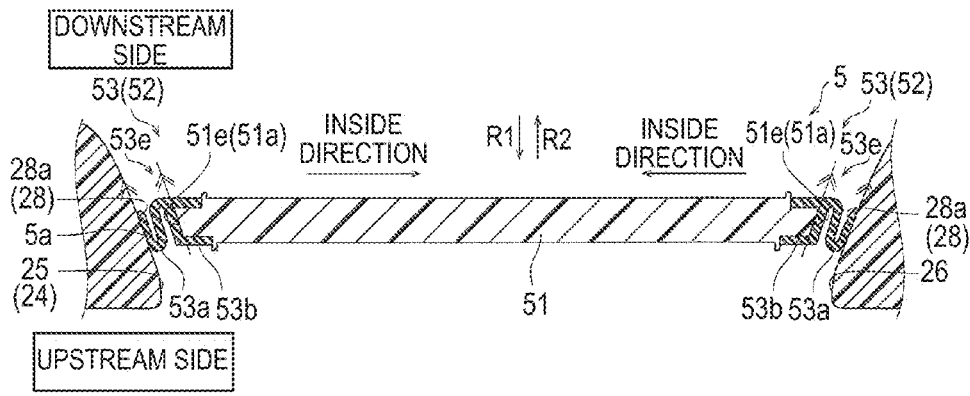
FIG. 12 is an enlarged cross-sectional view showing a seal side surface portion on the downstream side at the closing position of the intake device according to the embodiment disclosed here.
Figure 13:
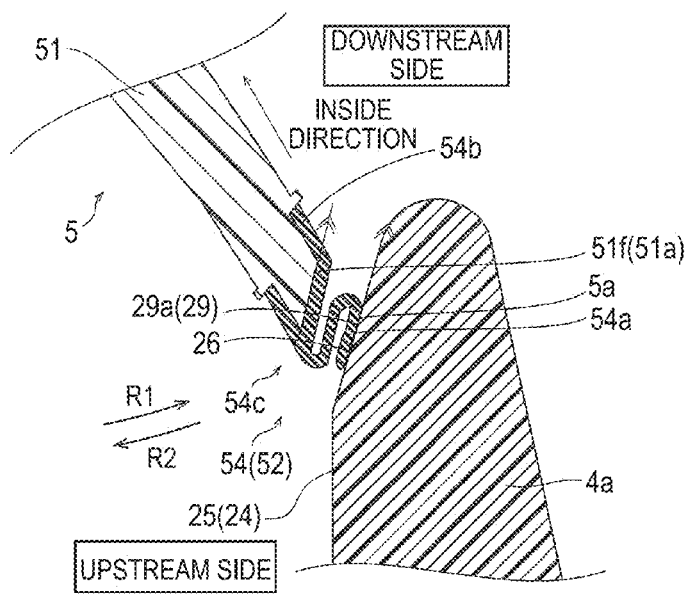
FIG. 13 is an enlarged cross-sectional view showing a seal surface portion on the upstream side at the closing position of the intake device according to the embodiment disclosed here.
Figure 14:
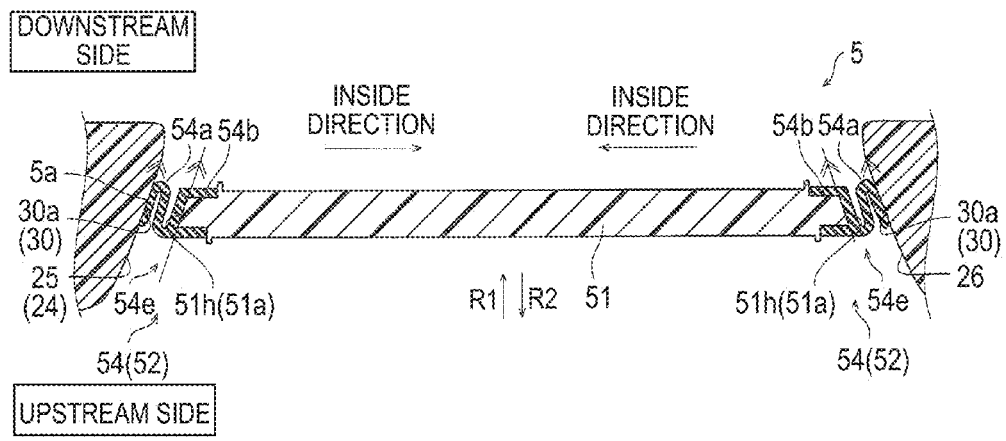
FIG. 14 is an enlarged cross-sectional view showing a seal side surface portion on the upstream side at the closing position of the intake device according to the embodiment disclosed here.

The seal surface portion 27 is configured such that the seal portion 53c corresponding to the straight portion 51c of the valve body main body 51, of the seal portion 53, comes into contact therewith, as shown in FIG. 11. The seal side surface portion 28 is configured such that the seal portions 53d corresponding to the pair of curved portions 51d of the valve body main body 51 and the seal portions 53e corresponding to the pair of straight portions 51e, of the seal portion 53, come into contact therewith, as shown in FIG. 12. The seal surface portion 29 is configured such that the seal portion 54c corresponding to the straight portion 51f of the valve body main body 51, of the seal portion 54, comes into contact therewith, as shown in FIG. 13. Further, the seal side surface portion 30 is configured such that the seal portions 54d corresponding to the pair of curved portions 51g and the seal portions 54e corresponding to the pair of straight portions 51h come into contact therewith, as shown in FIG. 14.

Here, in this embodiment, as shown in FIG. 11, the seal surface portion 27 with which the seal portion 53c comes into contact has the inner contact portion 27a with which the stopper portion 53f of the seal portion 53 comes into contact, and an outer contact portion 27b with which the deformation portion 53a of the seal portion 53 comes into contact. The inner contact portion 27a is formed to protrude toward the inside (the valve body 5 side) from the inner wall surface 25 so as to have a contact surface larger than at least the width W (refer to FIG. 8) of the stopper portion 53f. In addition, a protrusion amount of the inner contact portion 27a formed on the seal surface 26 is configured so as to be about 2.5 mm. In addition, the outer contact portion 27b is an example of a "first outer contact portion" in this disclosure.

Further, the outer contact portion 27b is disposed on the downstream side of the inner contact portion 27a and formed further to the outside (the opposite side to the valve body 5) than the inner contact portion 27a. Further, the outer contact portion 27b is inclined toward a direction (the inside direction) in which the opening portion 24 narrows toward the upstream side from the downstream side. In this way, when the valve body 5 is rotated in the rotation direction R1 (when the valve body 5 is rotated toward the closing position), it is possible to bring the seal portion 53c into close contact with the seal surface portion 27 which gradually narrows.

Further, the seal surface portion 27 is formed on the inner wall surface 25 formed in an arc shape, of the second port portion 22. In this way, the inner contact portion 27a can be formed to protrude so as not to substantially interrupt the intake air flow path A.

Further, the seal side surface portion 28 with which the seal portions 53d and 53e come into contact has an outer contact portion 28a with which the deformation portion 53a of the seal portion 53 comes into contact, as shown in FIG. 12, and on the other hand, has no inner contact portion protruding toward the inside (the valve body 5 side) from the inner wall surface 25. Further, the outer contact portion 28a is inclined toward a direction (the inside direction) in which the opening portion 24 narrows toward the downstream side from the upstream side. In this way, when the valve body 5 is rotated in the rotation direction R1 (when the valve body 5 is rotated toward the closing position), it is possible to bring the seal portions 53d and 53e into close contact with the seal side surface portion 28 which gradually narrows. In addition, the outer contact portion 28a is an example of a "second outer contact portion" in this disclosure.

Further, as shown in FIGS. 13 and 14, the seal surface portion 29 with which the seal portion 54c comes into contact and the seal side surface portions 30 with which the seal portions 54d and 54e come into contact respectively have outer contact portions 29a and 30a with which the deformation portion 54a of the seal portion 54 comes into contact, and on the other hand, has no inner contact portion protruding toward the inside (the valve body 5 side) from the inner wall surface 25. Further, the outer contact portions 29a and 30a are inclined toward a direction (the inside direction) in which the opening portion 24 narrows toward the upstream side from the downstream side. In this way, when the valve body 5 is rotated in the rotation direction R1 (when the valve body 5 is rotated toward the closing position), it is possible to bring the seal portion 54c into close contact with the seal surface portion 29 which gradually narrows, and it is possible to bring the seal portions 54d and 54e into close contact with the seal side surface portions 30 which gradually narrow. In addition, the outer contact portions 29a and 30a are an example of a "second outer contact portion" in this disclosure.

Further, as shown in FIGS. 11 and 13, the outer contact portion 27b of the seal surface portion 27 with which the seal portion 53c corresponding to the straight portion 51c of the valve body main body 51 comes into contact and the seal surface portion 29 (the outer contact portion 29a) with which the seal portion 54c corresponding to the straight portion 51f of the valve body main body 51 comes into contact are formed to be inclined in a direction in which the intake air flow path A is expanded (formed so as to overhang at an acute angle with respect to the intake air flow path A) and have a mortar-shaped cross-sectional shape. On the other hand, as shown in FIGS. 12 and 14, the seal side surface portion 28 (the outer contact portion 28a) with which the seal portions 53e corresponding to the pair of straight portions 51e of the valve body main body 51 come into contact and the seal side surface portions 30 (the outer contact portions 30a) with which the seal portions 54e corresponding to the pair of straight portions 51h of the valve body main body 51 come into contact are not formed so as to be inclined in the direction in which the intake air flow path A is expanded.

Further, as shown in FIGS. 11 and 13, a configuration is made such that a force with which the seal surface portion 27 and the deformation portion 53a of the seal portion 53c come into contact with each other is smaller than a force with which the seal surface portion 29 and the deformation portion 54a of the seal portion 54c come into contact with each other and the seal surface portion 27 and the deformation portion 53a of the seal portion 53c are easily shifted from each other. At this time, the stopper portion 53f of the seal portion 53 and the inner contact portion 27a come into contact with each other, whereby it is possible to suppress the seal surface portion 27 and the deformation portion 53a of the seal portion 53c from being deviated from each other.

Further, as shown in FIGS. 11 to 14, the outer contact portions 27b, 28a, 29a, and 30a of the seal surface 26 are inclined so as to be substantially parallel to the inclination of the side surface of the outer periphery 51a of the valve body main body 51. In this way, it is possible to deform the deformation portion 53a of the seal portion 53 so as to come into closer contact with the outer contact portions 27b and 28a. Similarly, it is possible to make an area of surface contact larger by deforming the deformation portion 54a of the seal portion 54 so as to come into closer contact with the outer contact portions 29a and 30a.

Further, a configuration is made such that when the stopper portion 53f of the seal portion 53 comes into contact with the inner contact portion 27a (when the valve body 5 is located at the closing position), the seal portion 53c comes into contact with the outer contact portion 27b of the seal surface portion 27 and the seal portions 53d and 53e come into contact with the outer contact portion 28a of the seal side surface portion 28. In addition, a configuration is made such that the seal portion 54c comes into contact with the outer contact portion 29a of the seal surface portion 29 and the seal portions 54d and 54e come into contact with the outer contact portion 30a of the seal side surface portion 30. As a result, a configuration is made such that the stopper portion 53f formed only in the seal portion 53c corresponding to the straight portion 51c of the valve body main body 51 comes into contact with the inner contact portion 27a, whereby the valve body 5 is positioned with respect to the second port portion 22.

Further, when the valve body 5 is located at the closing position, the straight portion 51c of the valve body main body 51 is formed to be spaced apart with respect to the inner contact portion 27a of the seal surface portion 27 so as to face in the rotation direction R1 (or R2). On the other hand, the straight portion 51c of the valve body main body 51 is formed to be spaced apart in the inside direction from the outer contact portion 27b of the seal surface portion 27. Similarly, when the valve body 5 is located at the closing position, the pair of straight portions 51e of the valve body main body 51 is formed to be spaced apart in the inside direction from the outer contact portion 28a of the seal side surface portion 28. Further, the straight portion 51f of the valve body main body 51 is formed to be spaced apart in the inside direction from the outer contact portion 29a of the seal surface portion 29. Further, the pair of straight portions 51h of the valve body main body 51 is formed to be spaced apart in the inside direction from the outer contact portion 30a of the seal side surface portion 30. In this way, direct contact of the valve body main body 51 with the inner wall surface 25 is suppressed.

In the embodiment described above, it is possible to obtain the following effects.

In this embodiment, as described above, in the seal surface 26, the seal surface portion 27 is provided which has the inner contact portion 27a which is formed so as to protrude toward the inside (the valve body 5 side) from the inner wall surface 25 and with which the stopper portion 53f of the seal portion 53 comes into contact, and the outer contact portion 27b which is formed further to the outside (the opposite side to the valve body 5) than the inner contact portion 27a and with which the deformation portion 53a of the seal portion 53 comes into contact. Further, in the seal surface 26, the seal side surface portion 28 which has the outer contact portion 28a with which the deformation portion 53a of the seal portion 53 comes into contact and on the other hand, has no inner contact portion protruding toward the inside (the valve body 5 side) from the inner wall surface 25 is provided, and the seal surface portion 29 and the seal side surface portion 30 which respectively have the outer contact portions 29a and 30a with which the deformation portion 54a of the seal portion 54 comes into contact and on the other hand, have no inner contact portion protruding toward the inside (the valve body 5 side) from the inner wall surface 25 are provided. In this way, the inner contact portion protruding to the inside of the intake port 2 is not provided in the seal side surface portion 28, the seal surface portion 29, and the seal side surface portion 30, and therefore, it is possible to suppress a narrowing of the intake air flow path A in the seal side surface portion 28, the seal surface portion 29, and the seal side surface portion 30. In this way, it is possible to suppress an increase in pressure loss of intake air.

Further, in this embodiment, the seal surface portion 27 having the inner contact portion 27a is provided in the seal surface 26, whereby it is possible to perform adjustment such that a contact position between the outer contact portion 27b and the valve body 5, a contact position between the outer contact portion 28a and the valve body 5, a contact position between the outer contact portion 29a and the valve body 5, and a contact position between the outer contact portion 30a and the valve body 5 become proper, with a position where the inner contact portion 27a of the seal surface portion 27 and the valve body 5 come into contact with each other as a proper contact position which becomes a reference. In this way, it is possible to suppress the contact of the valve body 5 with the outer contact portions 27b, 28a, 29a, and 30a in a deviated state and it is possible to suppress the valve body 5 from over rotating without contact with the seal surface 26. Therefore, it is possible to favorably maintain sealing properties (close contact properties) between the valve body 5 and the seal surface 26.

Further, in this embodiment, a configuration is made such that the seal portion 53c of the outer peripheral portion 5a of the valve body 5 comes into contact with the seal surface portion 27 of the seal surface 26 formed on the inner wall surface 25 of the opening portion 24 (the intake port 2), a configuration is made such that the seal portions 53d and 53e other than the seal portion 53c of the outer peripheral portion 5a of the valve body 5 come into contact with the seal side surface portion 28, a configuration is made such that the seal portion 54c other than the seal portion 53c of the outer peripheral portion 5a of the valve body 5 comes into contact with the seal surface portion 29, and a configuration is made such that the seal portions 54d and 54e other than the seal portion 53c of the outer peripheral portion 5a of the valve body 5 come into contact with the seal side surface portion 30. In this way, the seal portion 53c coming into contact with the seal surface portion 27, the seal portions 53d and 53e coming into contact with the seal side surface portion 28, the seal portion 54c coming into contact with the seal surface portion 29, and the seal portions 54d and 54e coming into contact with the seal side surface portion 30 are separately provided in the outer peripheral portion 5a of the valve body 5, whereby it is possible to more reliably bring the valve body 5 into contact with the inner contact portion 27a at a proper contact position and it is possible to suppress the contact of the valve body 5 with the outer contact portions 27b, 28a, 29a, and 30a in a deviated state.

Further, in this embodiment, the seal surface portion 27 having the inner contact portion 27a protruding to the inside of the intake port 2, of the seal surface 26 provided on the inner wall surface 25 of the opening portion 24 (the intake port 2), is configured such that the seal portion 53c extending along the X direction in which the rotating shaft 31 extends comes into contact therewith on the downstream side, the seal side surface portion 28 having no inner contact portion is configured such that the seal portions 53d and 53e extending along the direction orthogonal to the X direction in which the rotating shaft 31 extends come into contact therewith, the seal surface portion 29 having no inner contact portion is configured such that the seal portion 54c extending along the X direction in which the rotating shaft 31 extends comes into contact therewith on the upstream side, and the seal side surface portion 30 having no inner contact portion is configured such that the seal portions 54d and 54e extending along the direction orthogonal to the X direction in which the rotating shaft 31 extends come into contact therewith. In this way, it is possible to make an area in which the inner contact portion protruding to the inside of the intake port 2 is formed, smaller than when providing an inner contact portion in a portion of the inner wall surface 25 with which a plurality of sides among four sides come into contact, and therefore, it is possible to further suppress a narrowing of the intake air flow path A. In this way, it is possible to further suppress an increase in pressure loss of intake air.

Further, in this embodiment, unlike a case where the valve body 5 and the inner contact portion come into contact with each other at a plurality of sides of the valve body 5, it is possible to set the side of the valve body 5 which first comes into contact with the inner contact portion 27a to necessarily be the seal portion 53c on the downstream side of the valve body 5. In this way, in the intake device 100 in which the valve body 5 is formed in each of the four intake ports 2, the side of the valve body 5 which first comes into contact with the inner contact portion 27a is not different for each of the intake ports 2, and therefore, it is possible to suppress an angle when bringing the valve body 5 and the seal surface 26 into contact with each other from varying for each of the intake ports 2, and as a result, it is possible to suppress sealing properties (close contact properties) between the valve body 5 and the seal surface 26 from varying for each of the intake ports 2.

Further, in this embodiment, the seal surface portion 27 with which the seal portion 53c corresponding to the straight portion 51c of the valve body main body 51 comes into contact and the seal surface portion 29 with which the seal portion 54c corresponding to the straight portion 51f of the valve body main body 51 comes into contact are formed to be inclined in the direction in which the intake air flow path A is expended. In this way, it is possible to reduce the influence of a narrowing of the intake air flow path A, and therefore, even if the inner contact portion 27a is provided, it is possible to suppress an increase in pressure loss of intake air.

Further, in this embodiment, the seal portion 53c coming into contact with both of the inner contact portion 27a and the outer contact portion 27b of the seal surface portion 27, the seal portions 53d and 53e coming into contact with the outer contact portion 28a of the seal side surface portion 28, the seal portion 54c coming into contact with the outer contact portion 29a of the seal surface portion 29, and the seal portions 54d and 54e coming into contact with the outer contact portion 30a of the seal side surface portion 30 are provided in the seal lip 52. In this way, by separately providing the seal portion 53c coming into contact with the seal surface portion 27, the seal portions 53d and 53e coming into contact with the seal side surface portion 28, the seal portion 54c coming into contact with the seal surface portion 29, and the seal portions 54d and 54e coming into contact with the seal side surface portion 30, it is possible to more reliably bring the valve body 5 into contact with the inner contact portion 27a at a proper contact position and it is possible to more reliably bring the valve body 5 into contact with the outer contact portions 27b, 28a, 29a, and 30a. Further, the seal lip 52 is elastically deformable, whereby it is possible to elastically deform the seal lip 52 so as to come into close contact with the outer contact portion 27b of the seal surface portion 27, the seal side surface portion 28, the seal surface portion 29, and the seal side surface portion 30, and therefore, it is possible to favorably maintain sealing properties (close contact properties) between the valve body 5 and the seal surface 26.

Further, in this embodiment, in the seal portion 53c, not only the deformation portion 53a, but also the stopper portion 53f is provided, and on the other hand, in the seal portions 53d and 53e, only the deformation portion 53a is provided, and in the seal portions 54c, 54d, and 54e, only the deformation portion 53a is provided. In this way, by separately providing the stopper portion 53f coming into contact with the inner contact portion 27a, and the deformation portion 53a coming into contact with the outer contact portion 27b, it is possible to more reliably bring the stopper portion 53f into contact with the inner contact portion 27a at a proper contact position. In addition, it is possible to suppress the contact of the deformation portion 53a with each of the outer contact portions 27b and 28a in a deviated state, and it is possible to suppress the contact of the deformation portion 54a with each of the outer contact portions 29a and 30a in a deviated state. Further, the stopper portion 53f is provided only in the seal portion 53c, whereby, compared to a case of providing the stopper portion 53f on the entire surface of the seal lip 52 or the entire surface of the seal portion 53, it is possible to reduce the weight of the seal lip 52.

Further, in this embodiment, a configuration is made such that the stopper portion 53f formed only in the seal portion 53c corresponding to the straight portion 51c of the valve body main body 51 comes into contact with the inner contact portion 27a, whereby the valve body 5 is positioned with respect to the intake port 2. In this way, it is possible to perform adjustment such that a contact position between the outer contact portion 27b and the deformation portion 53a of the seal portion 53c, a contact position between the outer contact portion 28a and the deformation portion 53a of each of the seal portions 53d and 53e, a contact position between the outer contact portion 29a and the deformation portion 54a of the seal portion 54c, and a contact position between the outer contact portion 30a and the deformation portion 54a of each of the seal portions 54d and 54e become proper, with a position where the inner contact portion 27a of the seal surface portion 27 and the stopper portion 53f come into contact with each other as a proper contact position which becomes a reference of positioning between the valve body 5 and the intake port 2. In this way, it is possible to suppress the contact of the outer contact portions 27b, 28a, 29a, and 30a with the seal lip 52 in a deviated state.

Further, in this embodiment, the seal portion 53c having the stopper portion 53f is formed so as to follow the straight portion 51c of the valve body main body 51, whereby it is possible to easily match the shape of the seal surface portion 27 with the shape of the seal portion 53c having a straight line shape, compared to a case of providing the seal portion 53c in the curved portion 51d. In this way, it is possible to more reliably bring the stopper portion 53f of the seal portion 53c into contact with the inner contact portion 27a at a proper contact position and it is possible to suppress the contact of the deformation portion 53a with the outer contact portion 27b in a deviated state.

Further, in this embodiment, the seal portion 53c is provided only in the outer periphery 51a of the straight portion 51c in the valve body main body 51, whereby it is possible to make an area in which the seal portion 53c is formed small, compared to a case where the seal portion 53c is provided in not only the straight portion 51c in the valve body main body 51, but also the outer periphery 51a of the curved portion 51d, and therefore, it is possible to suppress a narrowing of the intake air flow path A. In addition, the stopper portion 53f is not formed in a wide range, compared to a case where the seal portion 53c having the stopper portion 53f is formed in the curved portion 51d as well, and therefore, it is possible to suppress the stopper portion 53f first coming into contact with the inner contact portion 27a from varying for each of the intake devices 100. In this way, it is possible to suppress an angle when bringing the valve body 5 and the seal surface 26 into contact with each other from varying for each of the intake devices 100, and therefore, it is possible to suppress the occurrence of variation in sealing properties (close contact properties) between the valve body 5 and the seal surface 26.

Further, in this embodiment, the straight portion 51c of the valve body main body 51 is formed so as to be spaced apart in the inside direction from the outer contact portion 27b of the seal surface portion 27 when the valve body 5 is located at the closing position. Further, the pair of straight portions 51e of the valve body main body 51 is formed so as to be spaced apart in the inside direction from the outer contact portion 28a of the seal side surface portion 28. Further, the straight portion 51f of the valve body main body 51 is formed so as to be spaced apart in the inside direction from the outer contact portion 29a of the seal surface portion 29. Further, the pair of straight portions 51h of the valve body main body 51 is formed so as to be spaced apart in the inside direction from the outer contact portion 30a of the seal side surface portion 30. In this way, it is possible to suppress the contact of the valve body main body 51 with the outer contact portion 27b of the seal surface portion 27, the seal side surface portion 28, the seal surface portion 29, and the seal side surface portion 30, and therefore, it is possible to suppress the occurrence of a striking sound or the occurrence of damage to the valve body main body 51, the seal surface portions 27 and 29, and the seal side surface portions 28 and 30.

Further, in this embodiment, by configuring the valve body 5 of the intake control valve 3 so as to be able to change an intake air flow path length to each cylinder of an engine by opening and closing the opening portion 24, in a case of using a variable intake valve body (the valve body 5), it is possible to favorably maintain sealing properties (close contact properties) between the variable intake valve body (the valve body 5) and the seal surface 26 while suppressing an increase in pressure loss of intake air.

Next, simulation (flow analysis) to obtain the relationship between a protrusion amount of an inner contact portion of a seal surface and the flow rate of intake air in an intake air flow path will be described with reference to FIGS. 4 and 15.

In the simulation, a change in the flow rate of intake air in the opening portion 24 was obtained with the assumption that differential pressure of 6.67 kPa was generated between the surge tank 1 and the cylinder head 110 in a case where the intake control valve 3 is at the opening position shown in FIG. 4. At this time, changes in the flow rate of intake air in the opening portion in a case of assuming that the protrusion amount of the inner contact portion is 0 mm, 3 mm, 4 mm, and 5 mm were obtained. Then, from the result of the simulation, the flow rate of intake air in an example (a case where the protrusion amount of the inner contact portion is 2.5 mm) corresponding to this embodiment was estimated. In addition, a case where the protrusion amount of the inner contact portion is 5 mm is an example of the related art in which an inner contact portion protrudes from each of four sides to the inside of an opening portion.

Figure 15:
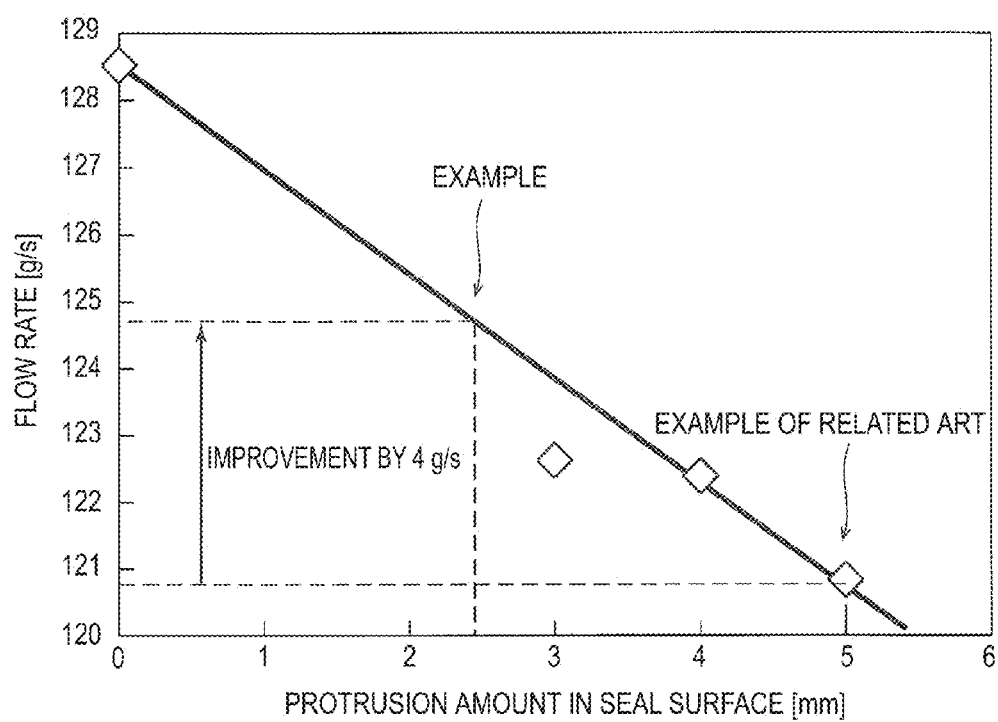
FIG. 15 is a diagram showing the result of simulation (flow analysis) performed in order to confirm the effects of this disclosure.

From the result of the simulation shown in FIG. 15, it could be confirmed that the flow rate of intake air became larger as the protrusion amount of the inner contact portion became smaller. Then, it could be confirmed that, compared to the flow rate of intake air in the example of the related art, the flow rate of intake air in the example corresponding to this embodiment increased by 4 g/s. In this way, it could be confirmed that, compared to the example of the related art, in the structure of this embodiment in which the protrusion amount of the inner contact portion is small, it was possible to improve the flow rate of intake air and it was possible to reduce pressure loss of intake air.

In addition, it should be considered that the embodiment disclosed here is an exemplification in all respects and is not restrictive. The scope of this disclosure is shown in the appended claims, rather than the description of the embodiment described above, and all changes within the meaning and the scope equivalent to the appended claims are included therein.

For example, in the embodiment described above, an example in which the intake device according to this disclosure is applied to an in-line four-cylinder engine for an automobile is shown. However, this disclosure is not limited thereto. The intake device according to this disclosure may be applied to an internal combustion engine other than an engine for an automobile and may also be applied to an internal combustion engine other than an in-line four-cylinder engine.

Further, in the embodiment described above, an example in which the intake device according to this disclosure is configured so as to be able to change an intake air flow path length is shown. However, this disclosure is not limited thereto. The intake device according to this disclosure may be applied to a case other than a case of changing an intake air flow path length, such as a tumble control valve (TCV) generating a longitudinal vortex, or a swirl control valve (SCV) generating a transverse vortex.

Further, in the embodiment described above, an example in which the inner contact portion 27a protruding toward the inside (the valve body 5 side) from the inner wall surface 25 is provided in the seal surface portion 27 coming into contact with the seal portion 53c (the side on the downstream side), of the seal surface 26, and an inner contact portion is not provided in the others, the seal side surface portion 28, the seal surface portion 29, and the seal side surface portion 30 is shown. However, this disclosure is not limited thereto. In this disclosure, an inner contact portion is not provided in the seal surface portion 27 and an inner contact portion may be provided in any one of the others, the seal side surface portion 28, the seal surface portion 29, and the seal side surface portion 30, and an inner contact portion may also be provided in two or more or three or less seal surface portions (seal side surface portions) of the seal surface portion 27, the seal side surface portion 28, the seal surface portion 29, and the seal side surface portion 30. In this way, it is possible to suppress a narrowing of the intake air flow path A in the seal surface 26.

In addition, it is preferable that the seal surface portion (the seal side surface portion) in which the inner contact portion is provided is any one of the seal surface portion 27, the seal side surface portion 28, the seal surface portion 29, and the seal side surface portion 30. In addition, it is preferable that the seal surface portion (the seal side surface portion) in which the inner contact portion is provided is any one of the seal surface portion 27 coming into contact with the seal portion 53*c* (the side on the downstream side), and the seal surface portion 29 coming into contact with the seal portion 54*c* (the side on the upstream side). In this case, the stopper portion comes into contact with the inner contact portion, whereby it is possible to suppress the first outer seal portion of the seal portion with the stopper portion provided therein and the first outer contact portion of the seal surface portion from being deviated from each other, and therefore, it is preferable that the seal surface portion (the seal side surface portion) in which the inner contact portion is provided is provided on the seal surface portion in which a force with which the deformation portion of the seal portion comes into contact with the seal surface portion is weak and it is easy to be deviated from each other, of the seal surface portion 27 with which the seal portion 53*c* (the side on the downstream side) comes into contact and the seal surface portion 29 with which the seal portion 54*c* (the side on the upstream side) comes into contact.

In addition, in a case of forming three or less seal surface portions (seal side surface portions) in which the inner contact portion is provided, it is preferable to provide the inner contact portion preferentially in the seal surface portions 27 and 29 which are formed to be inclined in the direction in which the intake air flow path A is expanded. In this way, it is possible to reduce the influence of a narrowing of the intake air flow path A, and therefore, even if the inner contact portion is provided in the seal surface 26, it is possible to suppress an increase in pressure loss of intake air.

Further, in the embodiment described above, an example in which the stopper portion 53*f* coming into contact with the inner contact portion 27*a* of the seal surface portion 27 is provided in the seal portion 53*c* (the side on the downstream side) formed at a position corresponding to the straight portion 51*c* (the side portion on the downstream side) of the valve body main body 51 and a stopper portion is not provided in the other seal portions 53*d*, 53*e*, 54*c*, 54*d*, and 54*e* is shown. However, this disclosure is not limited thereto. In this disclosure, the stopper portion may also be provided on the entire surface of the seal portion 53 by providing the stopper portion in the seal portions 53*d* and 53*e* other than the seal portion 53*c*. In this way, the cross-sectional shape of the seal portion 53 becomes substantially the same regardless of a position of the seal portion, and therefore, it is possible to easily form the seal portion 53. In addition, the stopper portion may be provided on the entire surface of not only the seal portion 53, but also the seal portion 54. In this way, a configuration can be made such that the seal portion 53 and the seal portion 54 are made of the same member, and therefore, it is possible to more easily form the seal lip 52. In addition, even in these cases, it is necessary to provide a second seal surface in which an inner contact portion protruding to the inside is not formed, in the seal surface 26 with which the seal lip 52 comes into contact.

Further, in the embodiment described above, an example in which the valve body 5 having a substantially rectangular shape is disposed in the opening portion 24 having a substantially rectangular shape in a plan view is shown. However, this disclosure is not limited thereto. In this disclosure, as long as the shape of the opening portion and the shape of the valve body are formed so as to correspond to each other, the shape of the opening portion and the shape of the valve body are not limited to a rectangular shape and may be, for example, a trapezoidal shape. Further, the curved portion may not be formed in the valve body (the valve body main body), and the sides (the side portions) may be connected to each other substantially at a right angle.

Further, in the embodiment described above, an example in which the stopper portion 53*f* is formed integrally with the deformation portion 53*a* and the mounting portion 53*b* of the seal portion 53*c* is shown. However, this disclosure is not limited thereto. In this disclosure, the stopper portion may be formed as a separate body from the deformation portion of the seal portion.

An aspect of this disclosure is directed to an intake device including: an intake port; a valve body which is disposed in the intake port and rotated around a rotating shaft between an opening position and a closing position; and a seal surface which is integrally provided at the intake port and made up of an inner wall surface with which the valve body comes into contact at the closing position of the valve body, wherein the seal surface includes a first seal surface having an inner contact portion which protrudes to the inside of the intake port and a first outer contact portion which is located further to the outside than the inner contact portion, and a second seal surface having a second outer contact portion without having the inner contact portion.

In the intake device according to the aspect of this disclosure, as described above, the first seal surface having the inner contact portion which protrudes to the inside of the intake port and the first outer contact portion which is located further to the outside than the inner contact portion, and the second seal surface having the second outer contact portion without having an inner contact portion are provided in the seal surface, whereby an inner contact portion protruding to the inside of the intake port is not provided in the second seal surface, and therefore, it is possible to suppress a narrowing of an intake air flow path in the second seal surface. In this way, it is possible to suppress an increase in pressure loss of intake air. Further, the first seal surface having the inner contact portion is provided in the seal surface, whereby it is possible to perform adjustment such that a contact position between the first outer contact portion and the valve body and a contact position between the second outer contact portion and the valve body become proper, with a position where the inner contact portion of the first seal surface and the valve body come into contact with each other as a proper contact position which becomes a reference. In this way, it is possible to suppress the contact of the valve body with the first outer contact portion and the second outer contact portion in a deviated state and it is possible to suppress the valve body from over rotating without contact with the seal surface. Therefore, it is possible to favorably maintain sealing properties (close contact properties) between the valve body and the seal surface.

In the intake device according to the aspect described above, it is preferable that the first seal surface is provided in a portion of the inner wall surface of the intake port with which a first portion of an outer peripheral portion of the valve body comes into contact, and the second seal surface is provided in a portion of the inner wall surface of the intake port with which a second portion other than the first portion of the outer peripheral portion of the valve body comes into contact. According to such a configuration, the first portion coming into contact with the first seal surface and the second portion coming into contact with the second seal surface are separately provided at the outer peripheral portion of the valve body, whereby it is possible to more reliably bring the valve body into contact with the inner contact portion at a proper contact position and it is possible to suppress the contact of the valve body with the first outer contact portion and the second outer contact portion in a deviated state.

In this case, it is preferable that the valve body has a rectangular shape having four sides in a plan view, the first seal surface is provided in a portion of the inner wall surface with which a side on any one side of a side on an upstream side and a side on a downstream side extending along an extension direction of a rotating shaft of the valve body comes into contact, and the second seal surface is provided in a portion of the inner wall surface with which a side on the other side of the side on the upstream side and the side on the downstream side comes into contact, and a portion of the inner wall surface with which a pair of sides extending in a direction intersecting the extension direction of the rotating shaft of the valve body comes into contact. According to such a configuration, the first seal surface having the inner contact portion protruding to the inside of the intake port is provided in the portion of the inner wall surface with which one side of the four sides of the valve body comes into contact and the second seal surface having no inner contact portion is provided in the portion of the inner wall surface with which the remaining three sides of the four sides of the valve body come into contact, whereby it is possible to make an area in which the inner contact portion protruding to the inside of the intake port is formed, smaller than when providing an inner contact portion in a portion of the inner wall surface with which a plurality of sides among the four sides come into contact, and therefore, it is possible to further suppress a narrowing of the intake air flow path. In this way, it is possible to further suppress an increase in pressure loss of intake air. Further, unlike a case where the valve body and the inner contact portion come into contact with each other at a plurality of sides of the valve body, it is possible to set the side of the valve body which first comes into contact with the inner contact portion to necessarily be a side (a side coming into contact with the first seal surface) on any one side of a side on the downstream side and a side on the upstream side of the valve body. In this way, in the case of the intake device in which the valve body is formed in each of the plurality of intake ports, the side of the valve body which first comes into contact with the inner contact portion is not different for each of the intake ports, and therefore, it is possible to suppress an angle when bringing the valve body and the seal surface into contact with each other from varying for each of the intake ports, and as a result, it is possible to suppress sealing properties (close contact properties) between the valve body and the seal surface from varying for each of the intake ports.

In the intake device according to the aspect described above, it is preferable that the valve body includes a valve body main body and an elastically deformable seal member provided along an outer periphery of the valve body main body, and the seal member includes a first seal portion which comes into contact with both of the inner contact portion and the first outer contact portion of the first seal surface, and a second seal portion which comes into contact with the second outer contact portion of the second seal surface. According to such a configuration, by separately providing the first seal portion coming into contact with the first seal surface and the second seal portion coming into contact with the second seal surface, it is possible to more reliably bring the valve body into contact with the inner contact portion at a proper contact position and it is possible to more reliably bring the valve body into contact with the first outer contact portion and the second outer contact portion. Further, the seal member is elastically deformable, whereby it is possible to elastically deform the seal member so as to come into close contact with the first seal surface and the second seal surface, and therefore, it is possible to favorably maintain sealing properties (close contact properties) between the valve body and the seal surface.

In this case, it is preferable that the first seal portion includes an inner seal portion which comes into contact with the inner contact portion, and a first outer seal portion which comes into contact with the first outer contact portion, and the second seal portion includes a second outer seal portion which comes into contact with the second outer contact portion. According to such a configuration, by separately providing the inner seal portion coming into contact with the inner contact portion and the first outer seal portion coming into contact with the first outer contact portion, it is possible to more reliably bring the inner seal portion of the first seal portion into contact with the inner contact portion at a proper contact position. In addition, it is possible to suppress the contact of the first outer seal portion with the first outer contact portion in a deviated state, and it is possible to suppress the contact of the second outer seal portion with the second outer contact portion in a deviated state.

In the configuration in which the seal member includes a first seal portion and a second seal portion, it is preferable that the valve body is configured so as to be positioned with respect to the intake port by contact of the inner seal portion with the inner contact portion. According to such a configuration, it is possible to perform adjustment such that a contact position between the first outer contact portion and the first outer seal portion and a contact position between the second outer contact portion and the second outer seal portion become proper, with a position where the inner contact portion of the first seal surface and the inner seal portion come into contact with each other as a proper contact position which becomes a reference of positioning between the valve body and the intake port. In this way, it is possible to suppress the contact of the first outer contact portion with the first outer seal portion in a deviated state and it is possible to suppress the contact of the second outer contact portion with the second outer seal portion in a state where a contact position therebetween is deviated.

In the configuration in which the seal member includes a first seal portion and a second seal portion, it is preferable that the valve body main body has a rectangular shape having four side portions in a plan view, a side portion on any one side of a side portion on the upstream side and a side portion on the downstream side extending along the extension direction of the rotating shaft of the valve body main body is formed in a straight line shape, and the side portion on one side and each of a pair of side portions extending in a direction intersecting the extension direction of the rotating shaft of the valve body main body are connected through a curved portion, and the first seal portion of the seal member is provided along an outer periphery of the side portion on one side of a straight line shape in the valve body main body. According to such a configuration, compared to a case where the first seal portion is provided in the curved portion, it is possible to easily match the shape of the seal surface with the shape of the first seal portion having a straight line shape. In this way, it is possible to more reliably bring the inner seal portion of the first seal portion into contact with the inner contact portion at a proper contact position and it is possible to suppress the contact of the first outer seal portion with the first outer contact portion in a deviated state. Further, compared to a case where the first seal portion is provided in not only the side portion on one side of a straight line shape in the valve body main body, but also an outer periphery of the curved portion, it is possible to reduce an area in which the first seal portion is formed, and therefore, it is possible to suppress a narrowing of the intake air flow path.

In the configuration in which the seal member includes a first seal portion and a second seal portion, it is preferable that a portion corresponding to the second seal surface of the valve body main body is disposed to be spaced apart from the second seal surface so as not to interfere with the second seal surface within a rotation range of the valve body. According to such a configuration, it is possible to suppress the contact of the valve body main body with the second seal surface, and therefore, it is possible to suppress the occurrence of a striking sound or the occurrence of damage to the valve body main body and the second seal surface.

In the intake device according to the aspect described above, it is preferable that the valve body include a variable intake valve body which is rotatably provided so as to open and close an opening portion between a surge tank and the intake port disposed downstream of the surge tank and changes a length of the intake port by opening and closing of the opening portion, and that the variable intake valve body is configured so as to come into contact with the first seal surface and the second seal surface. According to such a configuration, in a case of using the variable intake valve body, it is possible to favorably maintain sealing properties (close contact properties) between the variable intake valve body and the seal surface while suppressing an increase in pressure loss of intake air.

In addition, in addition to the intake device according to the aspect described above, another configuration as described below is also conceivable in this disclosure.

That is, another aspect of this disclosure is directed to an intake device including an intake port; a variable intake valve body which is disposed in the intake port and rotated around a rotating shaft between an opening position and a closing position; and a seal surface which is integrally provided at the intake port and made up of an inner wall surface with which the variable intake valve body comes into contact at the closing position of the variable intake valve body, wherein the seal surface includes a first seal surface having an inner contact portion which protrudes to the inside of the intake port and a first outer contact portion which is located further to the outside than the inner contact portion, and a second seal surface having a second outer contact portion without having an inner contact portion. According to such a configuration, the first seal surface having the inner contact portion which protrudes to the inside of the intake port and the first outer contact portion which is located further to the outside than the inner contact portion, and the second seal surface having the second outer contact portion without having an inner contact portion are provided in the seal surface, whereby an inner contact portion protruding to the inside of the intake port is not provided in the second seal surface, and therefore, it is possible to suppress a narrowing of an intake air flow path in the second seal surface. In this way, it is possible to suppress an increase in pressure loss of intake air. Further, the first seal surface having the inner contact portion is provided in the seal surface, whereby it is possible to perform adjustment such that a contact position between the first outer contact portion and the variable intake valve body and a contact position between the second outer contact portion and the variable intake valve body become proper, with a position where the inner contact portion of the first seal surface and the variable intake valve body come into contact with each other as a proper contact position which becomes a reference. In this way, it is possible to suppress the contact of the variable intake valve body with the first outer contact portion and the second outer contact portion in a deviated state and it is possible to suppress the variable intake valve body from over rotating without contact with the seal surface. Therefore, it is possible to favorably maintain sealing properties (close contact properties) between the variable intake valve body and the seal surface.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An intake device comprising:
   an intake port;
   a valve body which is disposed in the intake port and rotated around a rotating shaft between an opening position and a closing position, the valve body including a valve body main body extending in a radial direction and an elastically deformable seal member provided along an outer periphery of the valve body main body;
   a seal surface which is integrally provided at the intake port and made up of an inner wall surface with which the seal member comes into contact in the closing position of the valve body;
   wherein the seal surface includes a first seal surface possessing an inner contact portion which protrudes to the inside of the intake port along the valve body and a first outer contact portion which is located further away in the radial direction from the valve body than the inner contact portion, and a second seal surface possessing a second outer contact portion without an inner contact portion that protrudes to the inside of the intake port along the valve body;
   the valve body possessing a substantially rectangular shape with four sides in a plan view;
   the inner contact portion being provided on an upstream side of the substantially rectangular shape of the valve body, and the first outer contact portion being provided on a downstream side of the substantially rectangular shape of the valve body;
   the seal member including a first seal portion configured to come into contact with the inner contact portion and the first outer contact portion of the first seal surface in the closing position value body, and a second seal portion configured to come into contact with the second outer contact portion of the second seal surface in the closing position of the valve body;
   the first seal surface being provided in a portion of the inner wall surface which, in the closing position, contacts a first side of the valve body, the first side of the valve body being one of: (i) a side of the valve body on an upstream side extending along an extension direction of the rotating shaft, and (ii) a side of the valve body on a downstream side and extending along the extension direction of the rotating shaft;
   the second seal surface being provided in a portion of the inner wall surface which, in the closing position, contacts a second side of the valve body, the second side of the valve body being the other one of: (i) the side of the valve body on the upstream side and extending along the extension direction of the rotating shaft, and (ii) the side of the valve body on the downstream side and extending along the extension direction of the rotating shaft; and the second seal surface being further provided in a portion of the inner wall surface which, in the dosing position, contacts a pair of sides of the valve body extending in a direction intersecting the extension direction of the rotating shaft.

2. The intake device according to claim 1, wherein the first seal surface is provided in a portion of the inner wall surface of the intake port with which a first portion of an outer peripheral portion of the valve body comes into contact, and the second seal surface is provided in a portion of the inner wall surface of the intake port with which a second portion other than the first portion of the outer peripheral portion of the valve body comes into contact.

3. The intake device according to claim 1, wherein the first seat portion includes an inner seal portion which comes into contact with the inner contact portion, and a first outer seal portion which comes into contact with the first outer contact portion, and the second seal portion includes a second outer seal portion which comes into contact with the second outer contact portion.

4. The intake device according to claim 3, wherein the valve body is configured so as to be positioned with respect to the intake port by contact of the inner seal portion with the inner contact portion.

5. The intake device according to claim 1, wherein a side portion on any one of the first side of the valve body and the second side of the valve body is formed in a straight tine shape, and the side portion and each of a pair of side portions extending in a direction intersecting the extension direction of the rotating shaft of the valve body main body are connected through a curved portion, and the first seal portion of the seal member is provided along an outer periphery of the side portion on one side of a straight line shape in the valve body main body.

6. The intake device according to claim 1, wherein a portion of the valve body main body covered by the second seal surface is spaced apart from the second seal surface so that the portion of the valve body main body covered by the second seal surface does not interfere with the second seal surface when the valve body rotates.

7. The intake device according to claim 1, wherein the valve body includes a variable intake valve body which is rotatably provided so as to open and close an opening portion between a surge tank and the intake port disposed downstream of the surge tank and changes a length of the intake port by opening and closing of the opening portion, and the variable intake valve body is configured so as to come into contact with the first seal surface and the second seal surface.

8. The intake device according to claim 3, wherein the inner seal portion protrudes toward a direction away from the surface of the valve body main body, and a contact surface between the inner contact portion of the inner seal portion is substantially flat.

9. The intake device according to claim 3, wherein the inner contact portion possesses a contact surface larger than a contact surface of the inner seal portion, the inner seal portion and the first outer seal portion are provided separately, and the first sealing portion possesses a portion which does not come into contact with the inner wall surface between the inner seal portion and the first outside seal portion.

\* \* \* \* \*